US012654595B2

(12) United States Patent
Luan et al.

(10) Patent No.: US 12,654,595 B2
(45) Date of Patent: Jun. 16, 2026

(54) SEAT ASSEMBLY FOR A VEHICLE

(71) Applicant: Mercedes-Benz Group AG, Stuttgart (DE)

(72) Inventors: Yi Luan, Beijing (CN); Jiwei Zhang, Beijing (CN); Jingfan Guo, Beijing (CN); Weiran Zhou, Beijing (CN)

(73) Assignee: Mercedes-Benz Group AG, Stuttgart (DE)

( * ) Notice: Subject to any disclaimer, the term of this patent is extended or adjusted under 35 U.S.C. 154(b) by 1 day.

(21) Appl. No.: 18/855,985

(22) PCT Filed: Apr. 20, 2023

(86) PCT No.: PCT/CN2023/089458
§ 371 (c)(1),
(2) Date: Oct. 10, 2024

(87) PCT Pub. No.: WO2023/202661
PCT Pub. Date: Oct. 26, 2023

(65) Prior Publication Data
US 2025/0242728 A1      Jul. 31, 2025

(30) Foreign Application Priority Data
Apr. 20, 2022   (CN) .......................... 202210416954.5

(51) Int. Cl.
B60N 2/02          (2006.01)
B60N 2/00          (2006.01)
(Continued)

(52) U.S. Cl.
CPC ......... B60N 2/0224 (2013.01); B60N 2/0025 (2023.08); B60N 2/0268 (2023.08);
(Continued)

(58) Field of Classification Search
CPC .. B60N 2/0224; B60N 2/0025; B60N 2/0268; B60N 2/914; B60N 2/976; B60N 2/5621;
(Continued)

(56) References Cited

U.S. PATENT DOCUMENTS 6,088,642 A * 7/2000 Finkelstein .......... B60N 2/0228
701/49
6,088,643 A * 7/2000 Long ........................ A47C 4/54
297/284.3
(Continued)

FOREIGN PATENT DOCUMENTS

DE      10 2019 214 245 A1      3/2021

OTHER PUBLICATIONS

International Search Report (PCT/ISA/210) issued in PCT Application No. PCT/CN2023/089458 dated Jul. 26, 2023 (2 pages).
(Continued)

*Primary Examiner* — Russell Frejd
(74) *Attorney, Agent, or Firm* — Crowell & Moring LLP

(57)          ABSTRACT

A seat assembly for a vehicle includes a seat frame and a plurality of support units disposed on the seat frame. Each of the plurality of support units has a support tray, a cylinder connected to the support tray, a pressure sensor, an intake valve, and an exhaust valve. A gas supply to the cylinder is controllable via the inlet valve, a gas discharge from the cylinder is controllable via the exhaust valve, and an occupant of the vehicle is supportable by the support tray and a support force and a support height of the support tray is adjustable. A controller is configured to receive a pressure signal detected by the pressure sensor of each of the plurality of support units to control an open state or a closed state of the intake valve and the exhaust valve of each of the plurality of support units separately.

9 Claims, 2 Drawing Sheets

(51) Int. Cl.

| | |
|---|---|
| *B60N 2/56* | (2006.01) |
| *B60N 2/62* | (2006.01) |
| *B60N 2/64* | (2006.01) |
| *B60N 2/90* | (2018.01) |

(52) U.S. Cl.
CPC ............. *B60N 2/914* (2018.02); *B60N 2/976* (2018.02); *B60N 2/5621* (2013.01); *B60N 2/62* (2013.01); *B60N 2/64* (2013.01); *B60N 2002/981* (2018.02); *B60N 2210/40* (2023.08)

(58) Field of Classification Search
CPC ...... B60N 2/62; B60N 2/64; B60N 2002/981; B60N 2210/40
See application file for complete search history.

(56) References Cited

U.S. PATENT DOCUMENTS

| | | | | |
|---|---|---|---|---|
| 6,098,000 A | * | 8/2000 | Long ........................ | A47C 4/54 |
| | | | | 307/10.6 |
| 2017/0028875 A1 | * | 2/2017 | Masuda ................... | B60N 2/02 |
| 2018/0118054 A1 | | 5/2018 | Devilbliss et al. | |
| 2021/0276458 A1 | * | 9/2021 | Fujii ........................ | B60N 2/22 |

OTHER PUBLICATIONS

Written Opinion (PCT/ISA/237) issued in PCT Application No. PCT/CN2023/089458 dated Jul. 26, 2023 (5 pages).

* cited by examiner

SEAT ASSEMBLY FOR A VEHICLE

BACKGROUND AND SUMMARY OF THE INVENTION

The present disclosure relates to the field of vehicles, in particular to a seat assembly for a vehicle.

In recent years, with the development of society and the improvement of living standards, more and more people choose cars as the means of transportation. However, driving or riding in a vehicle for long hours is still tiring, and the vehicle seat, as an integral part of the vehicle, plays a key role in ride comfort.

A traditional vehicle seat includes a seat frame, foam arranged on the seat frame, and a seat cover wrapping the foam, wherein the structure of the seat frame as well as the shape and hardness of the foam are determinate, so the occupant can only adjust the body support through adjustment of the backrest inclination and seat cushion angle, etc. However, this type of seat cannot provide accurate and close-fitting support for various body parts of occupants of different body types, thus resulting in failure to provide fully fitting support and reduced comfort of the occupant. In addition, existing vehicle seats cannot meet the requirements of intelligence, networking and electrification.

For this reason, an object of the present disclosure is to provide an improved seat assembly for a vehicle, which seat assembly is capable of providing appropriate support for various body parts of occupants of different body types through a plurality of support units, thereby closely fitting the body of the occupant and improving the comfort. In addition, support units can be controlled separately, so that different functions can be implemented as needed in an individualized manner and the requirements of intelligence can be met.

According to the disclosure, a seat assembly for a vehicle is provided, wherein the seat assembly at least comprises:
- a seat frame;
- a plurality of support units arranged on the seat frame, wherein each of the support units comprises a support tray, a cylinder connected to the support tray, a pressure sensor, an intake valve and an exhaust valve, wherein a gas supply to the cylinder is controlled via the inlet valve, and a gas discharge from the cylinder is controlled via the exhaust valve, wherein the support tray is configured to support an occupant of the vehicle and adjust a support force and a support height through the cylinder;
- a controller, which is configured to receive a pressure signal detected by the pressure sensor and can control an open or closed state of the intake valve and the exhaust valve of each of the support units separately.

According to the disclosure, a seat assembly for a vehicle is provided with a plurality of support units on a seat frame, support trays of the support units directly touch and support an occupant of the vehicle, and these support trays are actuated by respective cylinders to adjust a support force and a support height of the support trays, wherein a controller controls the open or closed state of the intake valve and the exhaust valve associated with each cylinder based on a detected pressure signal in order to adjust a gas volume in each cylinder, thereby providing appropriate support for different body parts of the occupant and achieving a close fit with the body of the occupant. This effectively improves the comfort of the occupant. Here, foam formed in one piece with a defined shape and hardness is removed in order to avoid gaps between the seat and the body, especially the waist, of the occupant. Furthermore, the support units can be controlled independently of each other by the controller, so that different functions, such as a massage or warning function, can be implemented in an intelligent manner.

According to an exemplary embodiment of the disclosure, the support tray is connected to the cylinder through a universal joint; and/or the pressure sensor is arranged in the support tray or the cylinder; and/or the support tray is hexagonally shaped.

According to an exemplary embodiment of the disclosure, the controller is configured to calculate an optimized body pressure distribution according to the pressure signal from the pressure sensors of each of the support units, thereby adjusting the support force and the support height of the corresponding support tray by controlling the open or close state of the intake valve and the exhaust valve of the corresponding support unit.

According to an exemplary embodiment of the disclosure, the seat assembly further comprises an air pump unit, which is configured to supply gas to the cylinder of the support unit; or the cylinder of the support unit receives gas from an inherent air pump of the vehicle, wherein the seat assembly does not comprise the inherent air pump.

According to an exemplary embodiment of the disclosure, the seat assembly further comprises an interaction unit, through which the occupant of the vehicle controls the support units autonomously.

According to an exemplary embodiment of the disclosure, the occupant of the vehicle edits in an individualized manner and shares a massage program via the interaction unit.

According to an exemplary embodiment of the disclosure, the seat assembly further comprises an air-conditioning unit mounted in the seat frame, which is configured to generate cold air or hot air that flows to the occupant of the vehicle through gaps between each of the support units.

According to an exemplary embodiment of the disclosure, a vibrator is arranged in the support tray, which is configured to vibrate the support tray, thereby massaging or warning the occupant of the vehicle.

According to an exemplary embodiment of the disclosure, support units in different areas of the seat assembly implement different warning functions through the support force or vibration movement of the support trays.

According to an exemplary embodiment of the disclosure, the seat assembly further comprises a covering surface, which covers the seat frame, the cylinder of the support unit, the intake valve and the exhaust valve, wherein the support tray protrudes over the covering surface.

The principles, characteristics and advantages of the disclosure can be better understood by describing the disclosure in greater detail with reference to the accompany drawings.

DETAILED DESCRIPTION OF THE DRAWINGS

Figure 1:
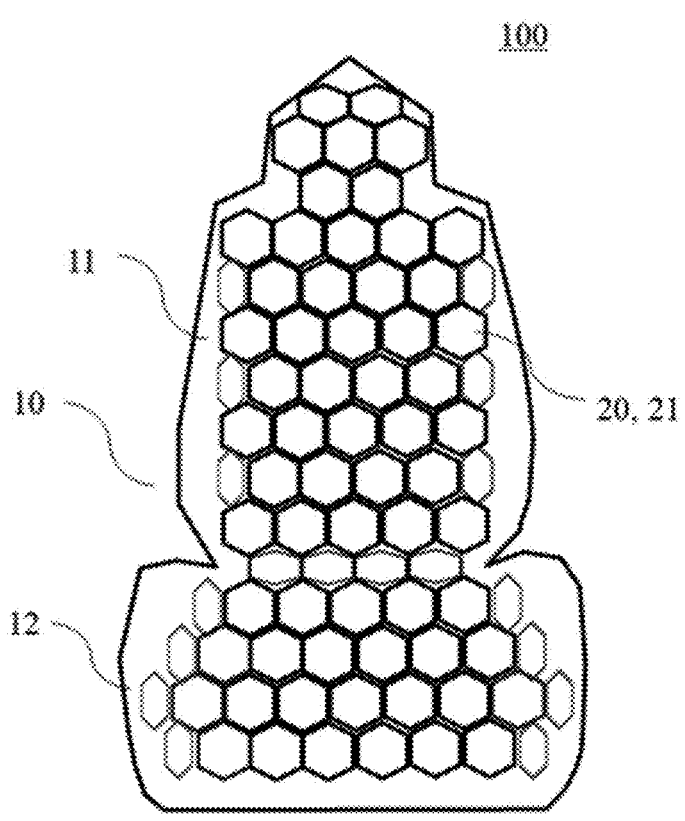
FIG. 1 shows a schematic view of a seat assembly for a vehicle according to an exemplary embodiment of the disclosure.

For a clearer understanding of the technical problems to be solved, technical solutions and advantageous technical effects of the present disclosure, the disclosure will be further elaborated below in conjunction with the drawings and a number of embodiments. It is to be understood that the specific embodiments described herein are simply for explaining the disclosure, rather than limiting the scope of protection of the disclosure.

In the description of the embodiments, directional or positional relationships such as "above", "below", "left", and "right" are based on the directional or positional relationships shown in the drawings, which are only for the convenience of description and simplification of operations, rather than specifying or implying that the device or element being referred to must be in a specific direction or be constructed and operated in a specific orientation, and therefore should not be construed as limitations on the disclosure.

In this specification, unless otherwise specified and limited, the terms "install", "link" and "connect" should be interpreted in a broad sense. For example, it may refer to a fixed connection, a detachable connection, or an integrated connection; it may refer to a mechanical connection or an electrical connection; and it may be a direct connection, an indirect connection through an intermediate part, or an internal communication between two elements. Those of ordinary skill in the art can understand the meanings of the above terms in the present disclosure according to the situation.

Figure 2:
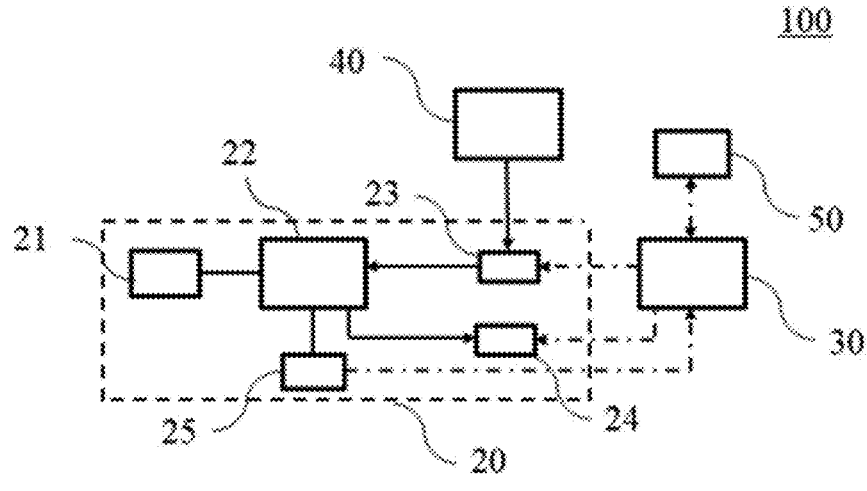
FIG. 2 shows a schematic block diagram of a seat assembly for a vehicle according to an exemplary embodiment of the disclosure.

FIG. 1 shows a schematic view of a seat assembly 100 for a vehicle according to an exemplary embodiment of the disclosure. FIG. 2 shows a schematic block diagram of a seat assembly 100 for a vehicle according to an exemplary embodiment of the disclosure. Here, the seat assembly 100 may be used for occupants of the vehicle, including drivers and passengers of the vehicle.

As shown in FIG. 1, the seat assembly 100 comprises a seat frame 10, which constitutes the frame of the entire seat assembly and has an upper part 11 and a lower part 12, wherein the upper part 11 is used for indirectly supporting the upper torso, in particular the back and waist, of the occupant, and the lower part 12 is used for indirectly supporting the lower torso, in particular the thighs, of the occupant. Here, the angle of the upper part 11 relative to the lower part 12 can be adjusted.

As shown in FIG. 1, the seat assembly 100 further comprises a plurality of support units 20 uniformly arranged on the seat frame 10, in particular substantially completely covering the upper part 11 and the lower part 12 of the seat frame 10.

As shown in FIG. 2, the support unit 20 has a support tray 21, which is configured to directly touch and support the body of the occupant who applies pressure to the support tray 21. Here, the support tray 21 is regularly shaped, for example as a hexagon, as shown in FIG. 1. In this way, a honeycomb distribution of the support trays 21 can be achieved and gaps between the adjacent support trays 21 can be effectively limited, and it also avoids sharp tingling feeling of the occupant. Certainly, other shapes considered meaningful by a person skilled in the art may also be taken into account, for example a circle or a square.

As shown in FIG. 2, the support unit 20 further comprises a cylinder 22 connected to the support tray 21. Here, by means of receiving gas, the cylinder 22 moves a piston in the cylinder 22 or applies pressure to the piston, thereby driving the support tray 21 connected to the piston of the cylinder 22 to move so as to change the support height of the support tray 21 or provide support force for the support tray 21, where the support force is balanced against the pressure exerted by the occupant on the support tray 21, wherein the cylinder 22 is in particular constructed as a micro-cylinder.

As shown in FIG. 2, the support unit 20 further comprises an intake valve 23 and an exhaust valve 24, both of which are connected to the cylinder 22, wherein by means of opening and closing of the intake valve 23, a gas supply to the cylinder 22 can be controlled, and by means of opening and closing of the exhaust valve 24, discharge of gas from the cylinder 22 can be controlled, so that the support force or support height of the support tray 21 can be further adjusted. It is easily understood here that when the intake valve 23 is opened and the exhaust valve 24 is closed, the cylinder 22 receives the supplied gas, the pressure in the cylinder 22 increases and the volume occupied by the gas increases, thereby providing a greater support force and raising the support height; when the intake valve 23 is closed and the exhaust valve 24 is opened, gas in the cylinder 22 is discharged, the pressure in the cylinder 22 reduces and the volume occupied by the gas decreases, thereby providing less support force and lowering the support height. In FIG. 2, solid arrows represent directions of the flow of gas, wherein gas can flow from the intake valve 23 to the cylinder 22 and flow from the cylinder 22 to the exhaust valve 24.

As shown in FIG. 2, the support unit 20 further comprises a pressure sensor 25, by means of which the pressure exerted by the occupant on the support tray 21 can be detected. As an example, the pressure sensor 25 is arranged in the cylinder 22, whereby it detects the support force provided by the cylinder 22 to the support tray 21, which support force is equal to the pressure applied to the support tray 21. However, it is also possible to consider that the pressure sensor 25 is arranged on the support tray 21 to directly detect the pressure exerted on the support tray 21.

As shown in FIG. 2, the seat assembly 100 further comprises a controller 30, which is configured to receive a pressure signal from the pressure sensor 25 and to control the open or closed state of the intake valve 23 and the exhaust valve 24 of each of the support units 20 according to the pressure signal, thereby adjusting the gas volume in the cylinder 22 correspondingly and further adjusting the support force provided to the support tray 21 and the support height of the support tray 21. In FIG. 2, dotted arrows represent directions of signal transmission, wherein the pressure sensor 25 transmits a pressure signal to the controller 30, and the controller 30 transmits the corresponding control signal to the intake valve 23 and the exhaust valve 24, thereby controlling the open or closed state of the intake valve 23 and the exhaust valve 24.

Exemplarily, the controller 30 can assess the body type and posture of the occupant according to the pressure signal from the pressure sensors 25 of each of the support units 20 in order to calculate an optimized body pressure distribution, which allows optimal support for different body parts, in particular the back and waist, of the occupant, thereby improving the occupant comfort. Here, the support force and support height of the corresponding support tray 21 are adjusted by controlling the open or closed state of the intake valve 23 and the exhaust valve 24 of the corresponding support unit 20. Exemplarily, the calculation process of the optimized body pressure distribution may be obtained based on experimental data and/or empirical data.

Exemplarily, the seat assembly 100 further comprises an air pump unit 40, which is mounted in the seat frame 10 and is configured to supply gas to the cylinders 22 of the support units 20, wherein the air intake valve 23 associated with the corresponding support unit 20 is arranged between the air pump unit 40 and the cylinder 22 to control the gas supply to the cylinder 22. However, it is also possible to consider that the seat assembly 100 is not provided with its own air pump unit; instead, the cylinder 22 of the support unit 20 receives gas from an inherent air pump, or air compressor, of the vehicle, wherein the seat assembly 100 does not comprise the inherent air pump.

Exemplarily, the seat assembly 100 further comprises an interaction unit 50, through which the occupant of the vehicle can send a control signal to the controller 30 so as to autonomously control the support units 20, thereby enabling separate adjustment of the support trays 21 of the support units 20 in different areas, and changing the support force or support height of the support trays 21 in a particular area in a targeted manner. Here, it especially can be considered that the occupant of the vehicle can edit a massage program in an individualized manner via the interaction unit 50, in which massage program the support force or support height of the support trays 21 of the support units 20 is regularly changed, thereby massaging the body parts of the occupant and relieving muscle fatigue. In addition, the occupant of the vehicle can also share the edited massage program with others via the interaction unit 50. Of course, it is also possible to consider that a set massage program is stored within the controller 30, and the occupant can select the set massage program via the interaction unit 50.

Exemplarily, the seat assembly 100 further comprises an air-conditioning unit mounted in the seat frame 10, which is configured to generate cold air or hot air as needed, and the cold air or hot air can flow to the body of the occupant seated in the seat assembly 100 through gaps between the support trays 21 of the support units 20, thereby implementing heating, cooling or venting functions of the seat assembly 100.

Figure 3:
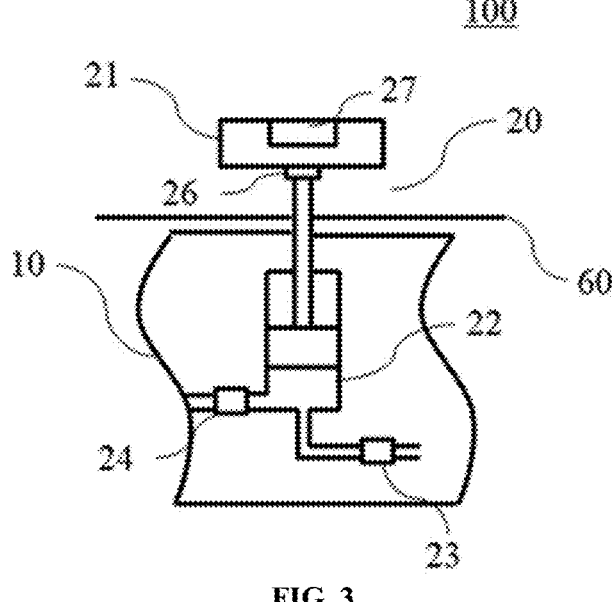
FIG. 3 shows a schematic view of part of a seat assembly for a vehicle according to an exemplary embodiment of the disclosure.

FIG. 3 shows a schematic view of part of a seat assembly 100 for a vehicle according to an exemplary embodiment of the disclosure.

As shown in FIG. 3, the cylinder 22 of the support unit 20 is arranged in the seat frame 10, and the support tray 21 connected to the cylinder 22 protrudes out of the seat frame, wherein the cylinder 22 is connected to the intake valve 23 and meanwhile also connected to the exhaust valve 24, where the gas volume in the cylinder 22 is controlled by the intake valve 23 and the exhaust valve 24 in order to adjust the support force and support height of the support tray 21.

Exemplarily, the support tray 21 is connected to the cylinder 22 through a universal joint 26, which allows flexible turning of the support tray 21, so that the support tray 21 can fit the body of the occupant better.

Exemplarily, a vibrator 27 is arranged in the support tray 21, which is configured to vibrate the support tray 21, thereby enabling the massage or warning function.

Exemplarily, a soft cushion is arranged on the support tray 21, which can improve the touch and appearance, thereby further improving the comfort of the occupant.

Exemplarily, support units 20 in different areas of the seat assembly 100 implement different warning functions through the support force or vibration movement of the corresponding support trays 21. For example, by means of the change in support force or the vibration movement of the corresponding support trays 21, the support units 20 in two lateral areas of the upper part 11 of the seat frame 10 warn the driver that a vehicle is approaching from one side; and by means of the change in support force or the vibration movement of the corresponding support trays 21, the support units 20 in an adjoining area between the upper part 11 and the lower part 12 of the seat frame 10 warn the driver that the backing vehicle is getting too close to an obstacle behind. Here, it can be considered that the support units 20, in particular the support trays 21, for implementing a specific warning function are constructed differently from the support units in other areas, so that a more noticeable warning effect can be achieved. However, it is also possible to consider that all the support units 20 are constructed identically.

Exemplarily, the seat assembly 100 further comprises a covering surface 60, which covers the seat frame 10, the cylinder 22 of the support unit 20, the intake valve 23 and the exhaust valve 24, wherein the support tray 21 protrudes over the covering surface 60. The covering surface 60 can shield the occupant from seeing the inner structure of the seat assembly 100, thereby improving the appearance. In addition, the covering surface 60 can also prevent pollutants such as dust from falling into the interior of the seat assembly 100.

The preceding explanation of the embodiments only describes the disclosure within the framework of the examples described here. Certainly, the individual features of the embodiments can be freely combined with one another, as long as it is technically meaningful without departing from the scope of the disclosure.

Other advantages and alternative embodiments of the disclosure are obvious to those skilled in the art. Therefore, the present disclosure in its broader sense is not limited to the specific details, representative structures, and exemplary embodiments shown and described here. On the contrary, those skilled in the art can make various modifications and substitutions without departing from the basic spirit and scope of the present disclosure.

The invention claimed is:

1. A seat assembly (100) for a vehicle, comprising:
a seat frame (10);
an air pump unit (40);
a plurality of support units (20) disposed on the seat frame (10), wherein each of the plurality of support units (20) comprises:
a support tray (21);
a cylinder (22) connected to the support tray (21);
a pressure sensor (25);
an intake valve (23); and
an exhaust valve (24);
wherein a gas supply to the cylinder (22) from the air pump unit (40) is controllable via the intake valve (23), wherein a gas discharge from the cylinder (22) is controllable via the exhaust valve (24), and wherein an occupant of the vehicle is supportable by the support tray (21) and a support force and a support height of the support tray (21) is adjustable through the cylinder (22); and
a controller (30), wherein the controller (30) is configured to receive a pressure signal detected by the pressure sensor (25) of each of the plurality of support units (20) and to control an open state or a closed state of the intake valve (23) and the exhaust valve (24) of each of the plurality of support units (20) separately according to the pressure signal.

2. The seat assembly (100) according to claim 1, wherein the support tray (21) is connected to the cylinder (22) through a universal joint (26), wherein the pressure sensor (25) is disposed in the support tray (21) or the cylinder (22), and wherein the support tray (21) is hexagonally shaped.

3. The seat assembly (100) according to claim 1, wherein the controller (30) is configured to calculate an optimized body pressure distribution according to the pressure signal from the pressure sensor (25) of each of the plurality of support units (20) and to adjust the support force and the support height of the respective support tray (21) by controlling the open state or the closed state of the respective intake valve (23) and the exhaust valve (24) according to the optimized body pressure distribution.

4. The seat assembly (100) according to claim 1, further comprising an interaction unit (50), wherein the plurality of support units (20) are controllable by the occupant of the vehicle via the interaction unit (50).

5. The seat assembly (100) according to claim 4, wherein a massage program is editable in an individualized manner by the occupant of the vehicle via the interaction unit (50) and wherein the massage program is sharable by the occupant of the vehicle via the interaction unit (50).

6. The seat assembly (100) according to claim 1, further comprising an air-conditioning unit mounted in the seat frame (10), wherein the air conditioning unit is configured to generate cold or hot air that is flowable to the occupant of the vehicle through gaps between each of the plurality of support units (20).

7. The seat assembly (100) according to claim 1, wherein a vibrator (27) is disposed in the support tray (21) and wherein the vibrator (27) is configured to vibrate the support tray (21), and/or wherein a soft cushion is disposed on the support tray (21).

8. The seat assembly (100) according to claim 1, wherein support units (20) of the plurality of support units (20) in different areas of the seat assembly (100) implement different warning functions through the support force or a vibration movement of the support tray (21) and/or wherein the support units (20) of the plurality of support units (20) in the different areas of the seat assembly (100) are constructed differently.

9. The seat assembly (100) according to claim 1, further comprising a covering surface (60), wherein the covering surface (60) covers the seat frame (10), the respective cylinders (22), the respective intake valves (23), and the respective exhaust valves (24) and wherein the respective support trays (21) protrude over the covering surface (60).

\* \* \* \* \*